United States Patent

[11] 3,609,087

[72] Inventors Chang W. Chi
Chicago;
Robert A. Macriss, Deerfield; William F. Rush, Arlington Heights, all of Ill.

[21] Appl. No. 702,294
[22] Filed Feb. 1, 1968
[45] Patented Sept. 28, 1971
[73] Assignee The American Gas Association, Inc.

[54] SECONDARY ALCOHOL ADDITIVES FOR LITHIUM BROMIDE-WATER ABSORPTION REFRIGERATION SYSTEM
5 Claims, 2 Drawing Figs.

[52] U.S. Cl. .......... 252/69, 62/112, 252/67, 252/68
[51] Int. Cl. .......... C09k 3/06
[50] Field of Search .......... 252/67, 68, 69; 62/112

[56] References Cited

UNITED STATES PATENTS 3,276,217 10/1966 Bourne et al. .......... 252/69

OTHER REFERENCES

Richtor, G. H., Textbook of Organic Chemistry, Wilsy, New York, 1943, pp. 72 and 78

*Primary Examiner*—Richard D. Lovering
*Assistant Examiner*—Irwin Gluck
*Attorney*—Molinare, Allegretti, Newitt & Witcoff

ABSTRACT: A refrigerant-absorbent solution as a working fluid for use in absorption refrigeration systems that produces a substantial increase in the overall capacity of the refrigeration machine by improving the heat transfer in the absorber, by promoting dropwise condensation of the refrigerant vapor on the exterior surfaces of the condenser tubes and by improving purging of relatively noncondensible gases of the absorption machine. The working fluid comprises water as the refrigerant in combination with lithium bromide as the absorbent to which is added additives such as 4-heptanol, decyl alcohol, 2-phenoxyethanol, nonanol, 3-methyl-2-heptanone, methyl octanoate, 3-methyl-2-heptanol, 1-heptanol, 1-octanol, 2-hexanol, 2-octanol, 2-methyl-2-hexanol, 2-methyl-2-heptanol, 6-methyl-2-heptanol, and 2-heptanol. These additives are supplied to the lithium bromide-water fluid in the range of 50 to 1,000 parts per million on a weight basis of the lithium bromide-water solution.

COMPARATIVE PRESSURE HISTORY

PATENTED SEP 28 1971 3,609,087
Fig. 1
SCHEMATIC DIAGRAM OF STATIC ABSORPTION APPARATUS
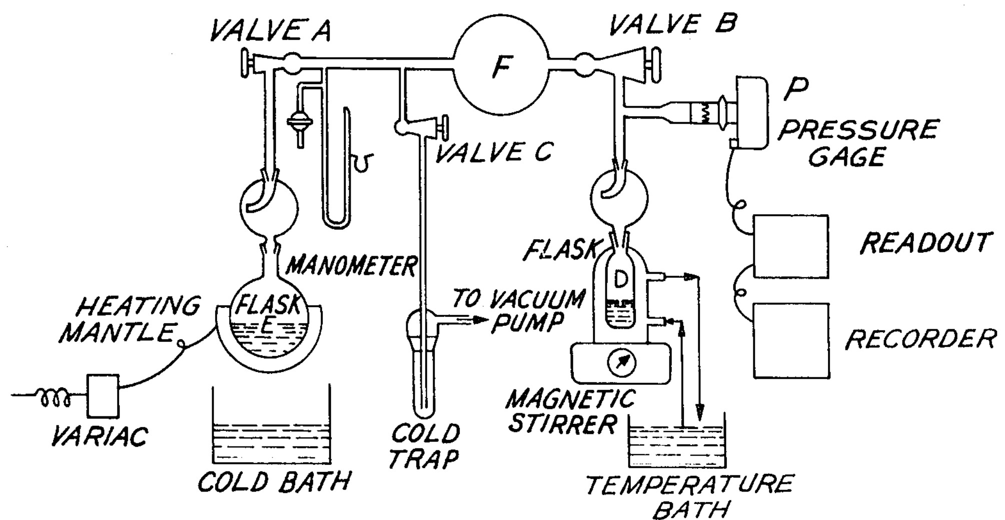
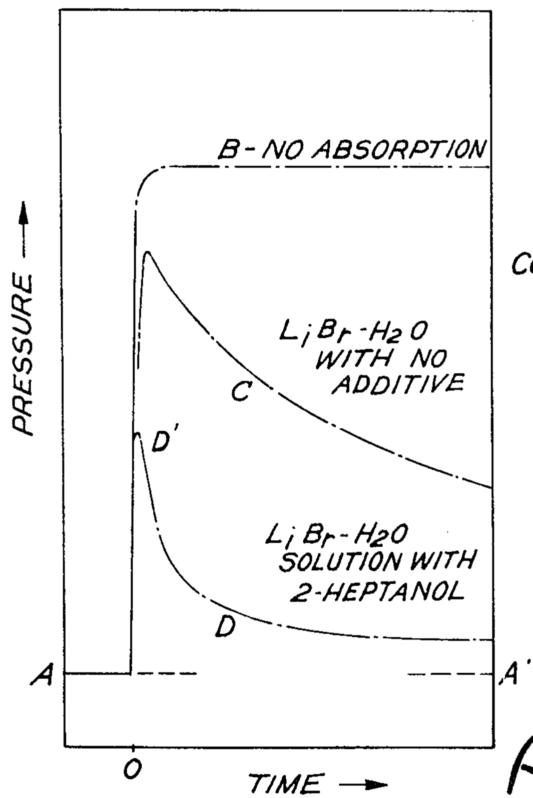
Fig. 2
COMPARATIVE PRESSURE HISTORY
INVENTORS
CHANG W. CHI,
ROBERT A. MACRISS
BY & WILLIAM F. RUSH
Bair, Freeman & Molinare
ATTORNEYS

SECONDARY ALCOHOL ADDITIVES FOR LITHIUM BROMIDE-WATER ABSORPTION REFRIGERATION SYSTEM

FIELD

This invention relates to refrigeration in accordance with the absorption refrigeration principle and more particularly to an absorbent possessing improved characteristics over known working fluids for use with absorption refrigeration systems.

BACKGROUND

Generally speaking, an absorption cycle uses two fluid streams in a totally enclosed system. One of these fluid streams is the refrigerant, which provides the cooling effect; the other is the absorbent, which conveys the refrigerant through part of the cycle. The major components of the system are a generator, condenser, evaporator, absorber, and heat exchanger. The refrigerant passes through all units; the absorbent is confined to movement through the generator, heat exchanger, and absorber. In this cycle no mechanical compressor is needed.

In operation, a mixture of absorbent and refrigerant is heated in the generator to boil off some of the refrigerant, which rises as vapor to the condenser where is it condensed as a liquid. The generator and condenser operate at relatively high pressure, so the condensing temperature of the refrigerant is sufficiently high to permit rejecting the latent heat to the ambient air or cooling water. The liquid refrigerant is throttled to lower pressure so it will boil at relatively low temperature in the evaporator to which it is conveyed and thus absorb heat from the air to be cooled while vaporizing. The vaporized refrigerant passes to the absorber, where it dissolves in cool absorbent solution which has come to the absorber from the generator outlet. The cool solution, now rich in refrigerant, is pumped back to the generator to continue the process. In the past, a lithium bromide-water combination refrigerant-absorbent has been utilized in systems of the type described above. An absorbent solution with a greater rate of refrigerant absorption will increase the capacity and/or efficiency of such machines.

OBJECTS

It is therefore an object of this invention to provide an absorbent solution that has an increased rate of refrigerant absorption as compared to prior art working fluids.

It is another object of the present invention to provide a substantially better absorbent solution or working fluid for use with absorption refrigeration systems than those which have been used in the past.

A further object of this invention is to provide a refrigerant-absorbent solution for use primarily in the region of the absorber and condenser tubes of the absorption machine which gives a general increase in refrigeration capacity.

Still another and more specific object of this invention is to provide additives which when added to lithium bromide-water working fluid affords an increase in the absorption of heat of the refrigerant absorbent solution.

Another object of this invention is to provide an improved additive for lithium bromide-water absorption refrigeration systems which assists in creating a heat transferring turbulent film on the exterior of the absorber tubes, provides improved purging of the relatively noncondensible gases involved in the absorption machines, and permits improved dropwise condensation of the refrigerant vapor on the exterior surfaces of the condenser tube thereby resulting in an improved condenser heat transfer.

Still other objects will be evident from the detailed description which follows:

DETAILED DESCRIPTION

Details of the invention will be described with reference to the following drawings:

FIG. 1 is a schematic diagram of the apparatus used to measure the rate of absorption of water into a concentrated lithium bromide-water solution for determination of half pressure times (HPT).

FIG. 2 is a graphical illustration of the pressure history of the refrigerant water vapor as comparatively absorbed by a working solution with and without an additive of this invention.

A suitable absorbent for a refrigeration system of the type described herein is a solution of lithium bromide and water. The concentration of the lithium bromide in the strong solution leaving the generator may be about 65 percent, and the lithium bromide concentration may range from 55 to 65 weight percent in the system. A suitable refrigerant is water. Our additives are added to the system to increase heat transfer in the condenser and absorber and consequently improve the performance in capacity of the refrigeration system. Although the mechanism of the observed phenomena is not entirely understood, and we do not wish to be bound by theory, some experimental evidence suggests the possibility that a condition for an effective increase in the capacity of an absorption machine is the existence of the additives in the region of the absorber and the condenser tube.

We have discovered that certain additives substantially improve the overall capacity of a conventional refrigeration machine. The working fluid of this invention comprises water as a refrigerant in combination with lithium bromide as the absorbent to which is added 4-heptanol, decyl alcohol, 2-phenoxyethanol, nonanol, 3-methyl-2-heptanone, methyl octanoate, 3-methyl-2-heptanol, 1-heptanol, 1-octanol, 2-hexanol, 2-octanol, 2-methyl-2-hexanol, 2-methyl-2-heptanol, 6-methyl-2-heptanol and 2-heptanol. These additives are supplied to the lithium bromide-water fluid in the range of 50 to 1000 parts per million on a weight basis of the lithium bromide-water solution. It has been found that these additives produce a substantial increase in the overall capacity of the refrigeration machine by improving the heat transfer in the absorber, by promoting dropwise condensation of the refrigerant vapor on the exterior surfaces of the condenser tubes, and by improving purging of relatively noncondensible gases from the absorber section of the machine. Of the above additives, more preferred groups are 2-octanol, 2-methyl-2-hexanol, 2-methyl-2-heptanol, 6-methyl-2-heptanol, 2-hexanol, 2-heptanol, and mixtures thereof. As disclosed in more detail below, the most preferred additive is 2-heptanol, which may be present in amounts ranging from 50 to 1000 parts per million, but is most conveniently added in an amount of about 400 parts per million.

In order to ascertain the effectiveness of such additives, water vapor absorption data was obtained and compared for the case when no additive is present in the lithium bromide water solution. This data can be presented in many forms, but a convenient and relevant method is to analyze and express this data as the half pressure time (HPT) in seconds. The HPT is defined as the time required for the water vapor pressure in an enclosed volume (flask F in FIG. 1) to reach one-half of its initial value as a result of water vapor absorption by lithium bromide solution in a separate volume connected therewith (flask D in FIG. 1).

The method of ascertaining the HPT's is as follows, the description referring particularly to FIG. 1. A salt solution is introduced into the jacketed flask, D, and water is introduced into holder E. After all of the air is pumped out of the solution of flask D and from the water of flask E, valve C connecting the system to the vacuum pump is closed. The desired amount of additive is then introduced into the flask D in the amounts previously discussed. With valve B isolating flask D from flask E, water from flask E is allowed to vaporize into water vapor holder F through valve A and then valve A is closed. The pressure of the water vapor of holder F is measured by manometer U whereas the pressure of the lithium bromide solution in flask D is measured by pressure gauge P while the solution in flask D is thermostated.

To start the experiment, valve B is suddenly opened to allow quick communication of vapor holder F with the vapor phase of flask D. As soon as valve B is opened, an instantaneous increase of the pressure above the solution in flask D is experienced. As water vapor is continuously absorbed by the solution in flask D, the pressure decreases until finally it reaches a minimum value equivalent to the vapor pressure of the solution in flask D at the temperature of the thermostated jacket. During all this time, the pressure is recorded as a continuous function of time. A typical example of such pressure time curves is shown in FIG. 2. In this chart, the pressure-time relationship from time zero increasing to the opening of valve B is shown for a number of cases such as the case when no absorption is taking place, the case when the solution of lithium bromide and water has no additive, and when the additive 2-heptanol is added to the solution of lithium bromide-water solution.

FIG. 2 illustrates the benefit of additives, specifically 2-heptanol the preferred additive of this invention, to lithium bromide-water working solution. The pressure in flask D of FIG. 2 is plotted as a function of time for various conditions (solutions) in flask D, which contains the working solutions. The solid line A represents the initial vapor pressure of the lithium bromide-water solution in flask D. The final LiBr-$H_2O$ solution vapor pressure in flask D is substantially identical and is therefore represented by the horizontal dashed line A'. In the first case, where there is no absorption of flask F water vapor by flask D solution, the pressure history in flask D is represented by line B. Thus, line B represents the vapor pressure of the water in flask D, which remains constant, as in the cases where no, or only water, refrigerant is present in flask D, or an "absorbent" in the refrigerant in flask D does not absorb vapor from F. Line C represents the condition where the absorbent in the water refrigerant in flask D is LiBr. The water vapor pressure in flask D falls along the curve C. Line D shows the effect of the additive 2-heptanol present in the LiBr-$H_2O$ working solution in flask D. The water vapor from flask F is rapidly absorbed by the solution in flask D in accordance with the curve D. The effect is immediate and rapid as seen from the fact that the water vapor pressure peaks at D' well below both the no absorption and no additive levels.

The following nonlimiting examples are illustrative of the invention.

EXAMPLE 1

The HPT's of the various additives of this invention were measured according to the procedure given above and compared to the case when no additive is present in the lithium bromide-water solution. The typical solution is taken as 56 weight percent lithium bromide in water and the half pressure times of the various additives added to the 56 weight percent lithium bromide solution in amounts varying from 0 through 600 parts per million were ascertained. The results obtained for the additives are presented in table 1.

TABLE 1

Comparison of Additives (56 wt. percent LiBr in $H_2O$ Solution)

| Additive | Amount of Additive, 0 | 100 | p.p.m. (By Weight) 200 | 400 | 600 |
|---|---|---|---|---|---|
| | | Half Pressure Time (HPT), Sec. | | | |
| No additive | 3.1 | | | | |
| 4-heptanol | | 2.25 | 2.40 | 2.40 | |
| decyl alcohol | | 1.56 | 1.56 | | |
| 2-phenoxyethanol | | | 1.32 | 2.00 | |
| nonunol | | 1.16 | | | 1.16 |
| 3-methyl-2-heptanone | | 1.1 | 1.3 | | |
| methyl octanoate | | 1.06 | 1.28 | 1.44 | |
| 3-methyl-2-heptanol | | 0.72 | 0.72 | | |
| 1-heptanol | | 0.94 | 0.67 | 0.67 | |
| 1-octanol | | 0.52 | 0.56 | 0.62 | 0.62 |
| 2-hexanol | | 0.55 | 0.40 | 0.55 | |
| 2-octanol | | 0.36 | 0.45 | 0.31 | 0.31 |
| 2-methyl-2-hexanol | | 0.70 | 0.61 | 0.28 | 0.28 |
| 2-methyl-2-heptanol | | 0.45 | 0.32 | 0.29 | 0.25 |
| 6-methyl-2-heptanol | | 0.36 | 0.36 | 0.23 | 0.23 |
| 2-heptanol | | 0.16 | 0.16 | 0.16 | |

EXAMPLE 2

In addition to these tests, and to verify the direct relationship existing between the HPT data and the performance in an actual absorber, a number of field tests were conducted utilizing two nominal 5-ton refrigeration capacity Arkla-water chillers, Models R 60–96. Such Arkla-water chillers are commercially available.

Unit No. 1 was operated with a lithium bromide-water solution for a period of time and under the test conditions its capacity was recorded. Then 200 parts per million of 6-methyl-2-heptanol were added to unit 1 and the unit was run for some time and its capacity was recorded. Finally, in the same unit 200 parts per million of the additive 2-heptanol were added and after a period of operation its capacity was recorded.

Unit 2 was operated for a period with no additive present in its lithium bromide-water working fluid and its capacity was recorded. Then 200 parts per million of the additive 2-heptanol were added and the new capacity was recorded. In all of these cases an increase in capacity of between 13.4 and 31.7 percent was observed over the capacity of these machines operating without an additive. The results of these tests are shown in detail on table 2.

TABLE 2.—FIELD TEST RESULTS

| Arkla-water [1] | Amount of additive, p.p.m. | Chilled water, gal./min. | Chilled water, ΔT ° F. | Unit capacity, B.t.u./hr. | Capacity gain over no additive, percent |
|---|---|---|---|---|---|
| Unit No. 1: | | | | | |
| Case I No Additive | | 12.0 | 8.1 | 48,500 | 0.0 |
| Case II 6-methyl-2-heptanol additive | 200 | 12.0 | 9.2 | 55,000 | 13.4 |
| Case III Mixture of 6-methyl-2-heptanol and 2-heptanol additive | 400 | 12.0 | 9.8 | 58,500 | 20.6 |
| Unit No. 2: | | | | | |
| Case I No Additive | | 11.9 | 7.8 | 46,300 | 0.0 |
| Case II 2-Heptanol additive | 200 | 12.5 | 9.8 | 61,000 | 13.7 |

[1] Chiller nominal 5 ton capacity Model R 60–96.

In view of the teachings set forth herein, it can be seen that the additives significantly improve the capacity of absorption refrigeration machines of the type using lithium bromide-water as the working fluid when added to such working fluids. While we have described our invention in connection with specific embodiments thereof, they are to be understood as being merely illustrative and not by way of limitation of the scope of our invention, which is defined solely in the appended claims which should be construed as broadly as the prior art will permit.

We claim:

1. A working fluid for absorption refrigeration systems comprising water as a refrigerant, and an aqueous solution of lithium bromide as an absorbent, to which is added an additive selected from 4-heptanol, 2-phenoxyethanol, 3-methyl-2-heptanone, methyl octanoate, 3-methyl-2-heptanol, 2-hexanol, 2-octanol, 2-methyl-2-hexanol, 2-methyl-2-heptanol, 6-methyl-2-heptanol, 2-heptanol, and mixtures thereof, and said additives are present in said working fluid in amounts ranging from about 50 to 1000 parts per million by weight.

2. A working fluid as in claim 1 wherein said additives are 2-octanol, 2-methyl-2-hexanol, 2-methyl-2-heptanol, 6-methyl-2-heptanol, 2-heptanol, and mixtures thereof.

3. A working solution as in claim 1 wherein said additive is 2-heptanol.

4. A working solution as in claim 3 wherein said 2-heptanol is present in said aqueous solution of lithium bromide in a range of 50–1000 p.p.m. by weight.

5. A working solution as in claim 4 wherein said 2-heptanol is present in said aqueous solution of lithium bromide in an amount of about 400 p.p.m. by weight.